(12) United States Patent
Chao

(10) Patent No.: US 8,009,400 B2
(45) Date of Patent: Aug. 30, 2011

(54) INTERFACE CIRCUIT AND PORTABLE ELECTRONIC DEVICE EMPLOYING THE SAME

(75) Inventor: Chien-Yao Chao, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 131 days.

(21) Appl. No.: 12/553,474

(22) Filed: Sep. 3, 2009

(65) Prior Publication Data

US 2010/0246075 A1  Sep. 30, 2010

(30) Foreign Application Priority Data

Mar. 25, 2009  (CN) .......................... 2009 1 0301135

(51) Int. Cl.
*H02H 9/00* (2006.01)
(52) U.S. Cl. ........................................ 361/91.1; 361/56

(58) Field of Classification Search ................... 361/56, 361/91.1, 111
See application file for complete search history.

(56) References Cited

U.S. PATENT DOCUMENTS

| 2004/0109271 A1* | 6/2004 | Takeda ........................... 361/56 |
| 2009/0109587 A1* | 4/2009 | Smith et al. ..................... 361/86 |
| 2010/0073837 A1* | 3/2010 | Predtetchenski et al. .... 361/91.5 |

* cited by examiner

*Primary Examiner* — Danny Nguyen
(74) *Attorney, Agent, or Firm* — Altis Law Group, Inc.

(57) ABSTRACT

An interface circuit for connecting with a universal serial bus (USB) data cable includes a USB connector for connecting with the USB data cable, an over voltage protection (OVP) circuit connected to the USB connector, and a time delay circuit connected to the USB connector and the OVP circuit to control the OVP circuit. The OVP circuit is switched off in a predetermined delay time of the time delay circuit when the USB data cable is connected to the USB connector, and is then switched on after the delay time of the time delay circuit.

10 Claims, 1 Drawing Sheet

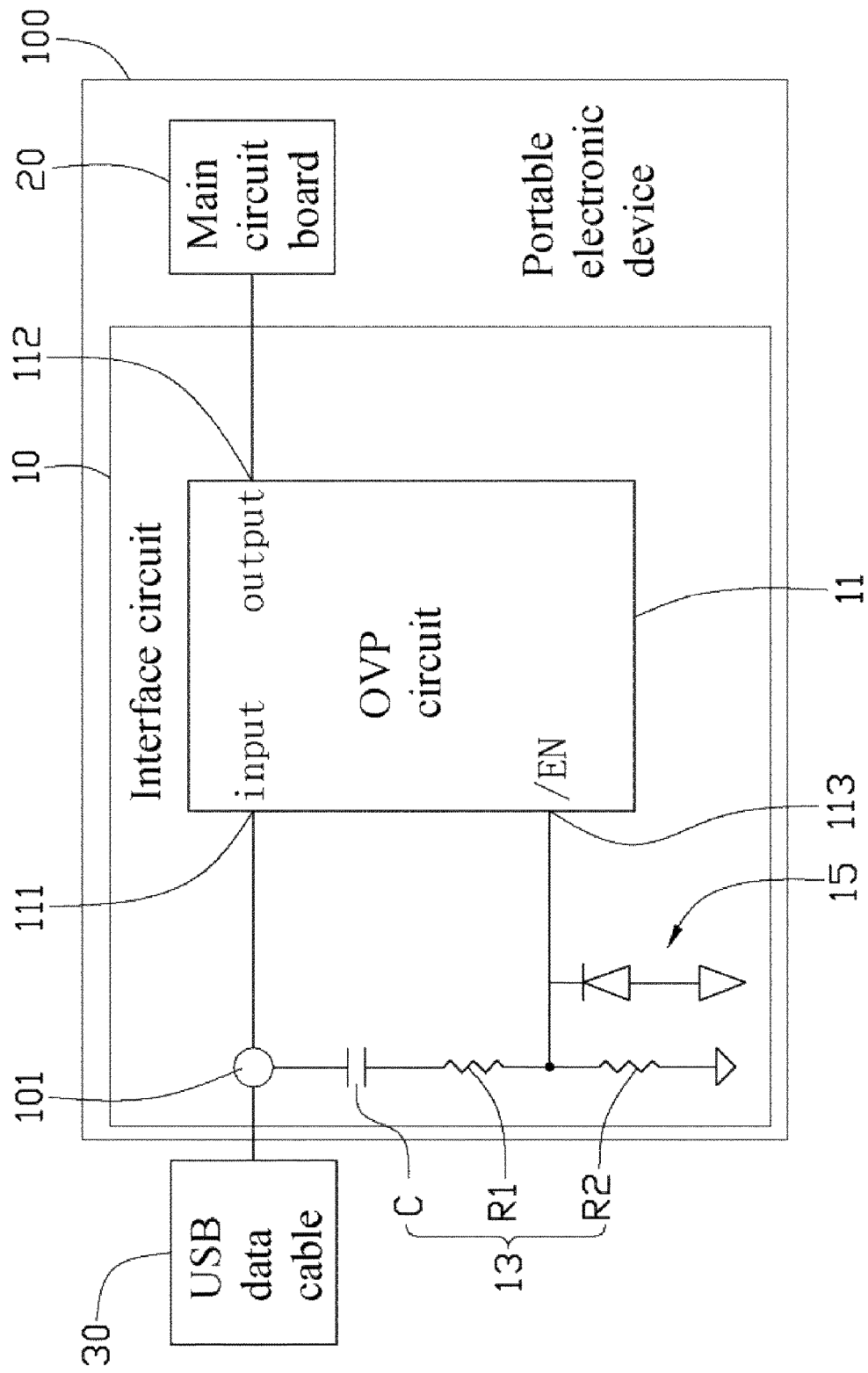

INTERFACE CIRCUIT AND PORTABLE ELECTRONIC DEVICE EMPLOYING THE SAME

BACKGROUND

1. Technical Field

The present disclosure relates to interface circuits, and particularly to an interface circuit capable of preventing surge currents and a portable electronic device employing the same.

2. Description of Related Art

Many portable electronic devices, such as mobile phones, personal digital assistants (PDA) and laptop computers, have universal serial bus (USB) interfaces. Thus, these portable electronic devices can be connected to each other via USB interfaces and USB data cables to transfer files.

When a USB data cable is connected to a USB interface of a portable electronic device, an electric potential in the USB interface may be suddenly changed by the USB data cable, and then a surge current may be generated. For example, an operation of connecting a USB cable to a USB interface of a mobile phone often generates an about 100 mA surge current, and the surge current generally attenuates after about at least 100 µs. Therefore, the surge current may damage inner circuits of the mobile phone.

Therefore, there is room for improvement within the art.

BRIEF DESCRIPTION OF THE DRAWINGS

Many aspects of the present interface circuit and portable electronic devices employing the same can be better understood with reference to the following drawings. The components in the drawing are not necessarily drawn to scale, the emphasis instead being placed upon clearly illustrating the principles of the present interface circuit and portable electronic devices employing the same.

The FIGURE is a circuit diagram of a portable electronic device, according to an exemplary embodiment.

DETAILED DESCRIPTION

The FIGURE schematically shows a portable electronic device 100, according to an exemplary embodiment. The portable electronic device 100 can be a mobile phone, a personal digital assistant (PDA), a laptop, etc. The portable electronic device 100 includes an interface circuit 10 and a main circuit board 20 connected to the interface circuit 10.

The interface circuit 10 includes a universal serial bus (USB) connector 101, an over voltage protection (OVP) circuit 11, a time delay circuit 13, and an electrostatic discharge (ESD) circuit 15. The OVP circuit 11 can be an OVP relay, which includes an input connector 111, an output connector 112 and a control connector (/EN) 113. Different electric potential levels inputted into the control connector 113 can respectively switch on or switch off the OVP circuit 11. In the present embodiment, the OVP circuit 11 can be set to be switched on (i.e., the input connector 111 is electronically connected to the output connector 112) when a relatively low electric potential level (e.g., lower than 4.2V, which is the upper limit working electric potential of most portable electronic devices) is inputted into the control connector 113, and can be set to be switched off (i.e., the input connector 111 is not electronically connected to the output connector 112) when a relatively high electric potential level (e.g., more than 4.2V) is inputted into the control connector 113. The USB connector 101 is electronically connected to the input connector 111.

The time delay circuit 13 is an RC time delay circuit, which includes a capacitor C, a first resistor R1 and a second resistor R2 connected in series. The capacitor C has one end connected to the USB connector 101 and another connected to the first resistor R1. The first resistor R1 has one end connected to the capacitor C and another end connector to the second resistor R2. The second resistor R2 has one end connected to the first resistor R1 and another end grounded. The control connector 113 is connected between the first resistor R1 and the second resistor R2. The capacitance of the capacitor C and the resistances of the first resistor R1 and the second resistor R2 can be regulated, such that the delay time of the time delay circuit 13 is longer than an attenuating time of most surge current caused by a suddenly changed electric potential when connecting the USB data cable 30 to the USB connector 101. Generally, the surge current attenuates evidently (i.e., in a manner of not causing damages to the main circuit board 20) after about 100 µs. Thus, in the present embodiment, the delay time of the time delay time 13 is set to be longer than about 100 µs.

The ESD circuit 15 can be an ESD protection diode, such as a zener diode, which has a cathode connected between the first resistor R1 and the second resistor R2 and an anode grounded.

When the portable electronic device 100 is used, the USB data cable 30 is connected to the USB connector 101. A suddenly changed electric potential capable of generating a surge current may be caused when connecting the USB data cable 30 to the USB connector 101. However, when the electric potential is inputted to the USB connector 101, the capacitor C connected to the USB connector 101 is charged by the electric potential, and a relatively high control electric level is generated between the first resistor R1 and the second resistor R2 and is inputted into the control connector 113. Thus, the OVP circuit 11 is switched off, and the USB data cable 30 cannot be connected to the main circuit board 20 via the OVP circuit 11. The surge current caused by the electric potential are then prevented from entering the main circuit board 20 by the OVP 11, such that the main circuit board 20 is protected from the surge current.

After a predetermined delay time of the time delay circuit 13, the capacitor C discharges, and a relatively low electric level is generated between the first resistor R1 and the second resistor R2 and is inputted into the control connector 113. The OVP circuit 11 is then switched on, and the main circuit board 20 is connected to the USB connector 101 via the OVP circuit 11. Thus, the portable electronic device 100 can transmit data via the USB data cable 30. Since the delay time of the time delay circuit 13 is longer than a time of obviating most surge current, when the OVP circuit is switched on, most surge current has already attenuated and cannot damage the main circuit board 20. The ESD circuit 15 obviates electrostatic discharge generated in the interface circuit 10.

As above-mentioned, when the USB data cable 30 is connected to the present portable electronic device 100, the time delay circuit 13 detects the suddenly changed electric potential caused by the USB data cable 30, and then automatically generates control electric levels inputted to the OVP circuit 11. The control electric levels control the OVP circuit 11 to be switched off to protect the main circuit board 20 from a surge current caused by the suddenly changed electric potential and to be switched on after the surge current attenuates. Therefore, the portable electronic device 100 can transmit data via the USB data cable 30, and is protected from the surge currents caused by the USB data cable 30.

The interface circuit 10 can also be used in other electronic devices. The delay time of the time delay circuit 13 can be regulated by regulating the capacitance of the capacitor C and the resistance of the first resistor R1 and the second resistor R2 to adapt the interface circuit 10 to different uses.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. An interface circuit for connecting with a universal serial bus (USB) data cable, comprising:
   a USB connector for connecting with the USB data cable;
   an over voltage protection (OVP) circuit connected to the USB connector, the OVP circuit including an input connector, an output connector, and a control connector; the input connector connected to the USB connector; and
   a time delay circuit connected to the USB connector and the OVP circuit to control the OVP circuit, the time delay circuit being an RC time delay circuit that includes a capacitor, a first resistor and a second resistor connected in series between the USB connector and the ground, the control connector being connected between the first resistor and the second resistor; wherein the OVP circuit is switched off in a predetermined delay time of the time delay circuit when the USB data cable is connected to the USB connector, and is then switched on after the delay time of the time delay circuit.

2. The interface circuit as claimed in claim 1, wherein the time delay circuit generates control electric levels inputted to the control connector to control the OVP circuit to be switched on or switched off.

3. The interface circuit as claimed in claim 2, wherein the OVP circuit is switched on when a relatively low electric level generated by the time delay circuit is inputted into the control connector and is switched off when a relatively high electric level generated by the time delay circuit is inputted into the control connector.

4. The interface circuit as claimed in claim 1, wherein a delay time of the time delay circuit is longer than about 100 µs.

5. The interface circuit as claimed in claim 1, further comprising an electrostatic discharge (ESD) circuit connected to the time delay circuit.

6. A portable electronic device, comprising:
   a main circuit board; and
   an interface circuit for connecting with a universal serial bus (USB) data cable; wherein the interface circuit is connected to the main circuit board and includes a USB connector for connecting with the USB data cable, an over voltage protection (OVP) circuit connected to the main circuit board and a time delay circuit connected to the OVP circuit to control the OVP circuit, the OVP circuit including an input connector connected to the USB connector, and output connector connected to the main circuit board, and a control connector connected to the time delay circuit; the time delay circuit being an RC time delay circuit that includes a capacitor, a first resistor, and a second resistor connected in series between the USB connector and the ground, the control connector being connected between the first resistor and the second resistor; the OVP circuit being switched off in predetermined delay time of the time delay circuit when the USB data cable is connected to the interface circuit to prevent the USB data cable from being connected to the main circuit board, and the OVP circuit being switched on after the delay time of the time delay circuit to connect the USB data cable to the main circuit board.

7. The portable electronic device as claimed in claim 6, wherein the time delay circuit generates control electric levels inputted to the control connector to control the OVP circuit to be switched on or switched off.

8. The portable electronic device as claimed in claim 7, wherein the OVP circuit is switched on when a relatively low electric level generated by the time delay circuit is inputted into the control connector and is switched off when a relatively high electric level generated by the time delay circuit is inputted into the control connector.

9. The portable electronic device as claimed in claim 6, wherein a delay time of the time delay circuit is longer than about 100 µs.

10. The portable electronic device as claimed in claim 6, further comprising an electrostatic discharge (ESD) circuit connected to the time delay circuit.

* * * * *